S. D. WRIGHT, E. W. SCHELLENTRAGER AND C. C. MARTIN.
TRUCK.
APPLICATION FILED AUG. 28, 1915.

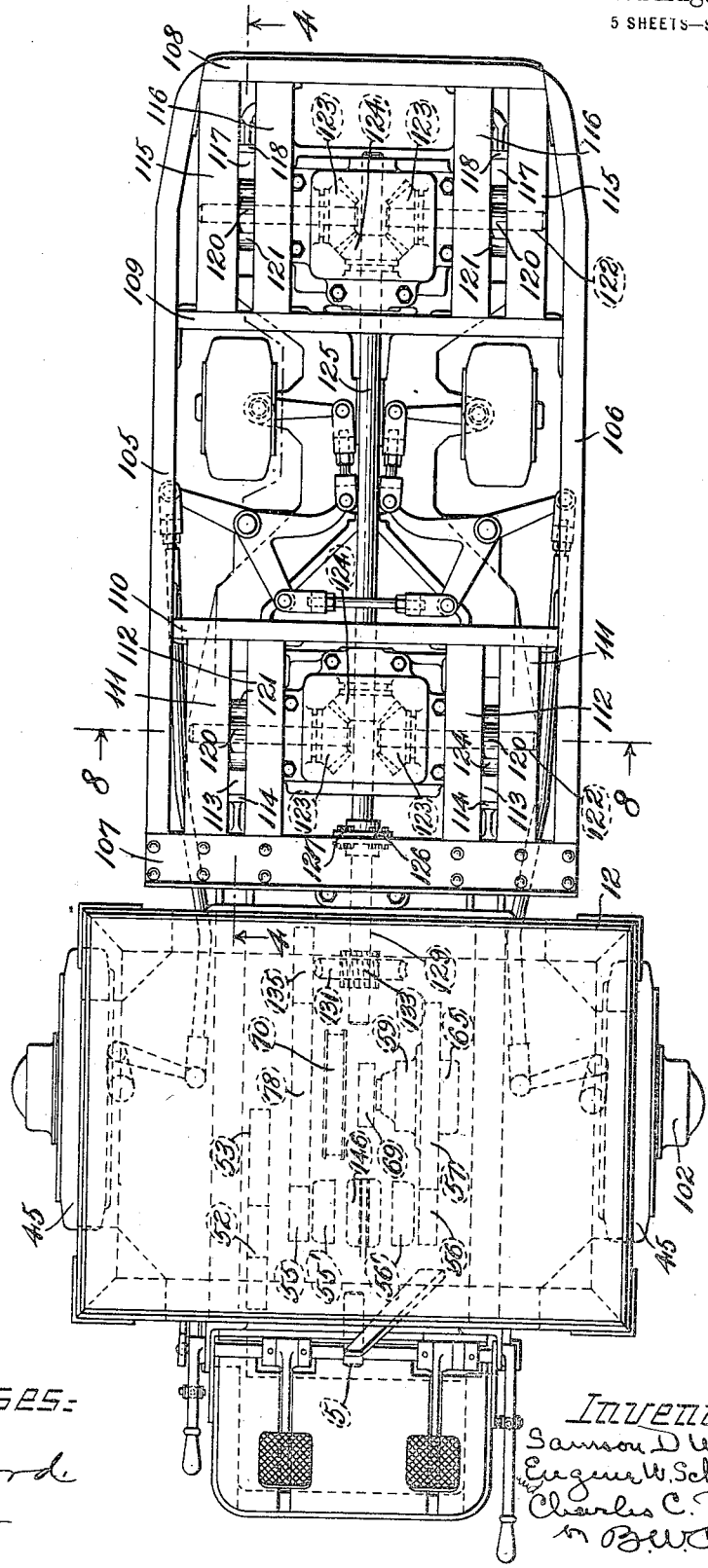

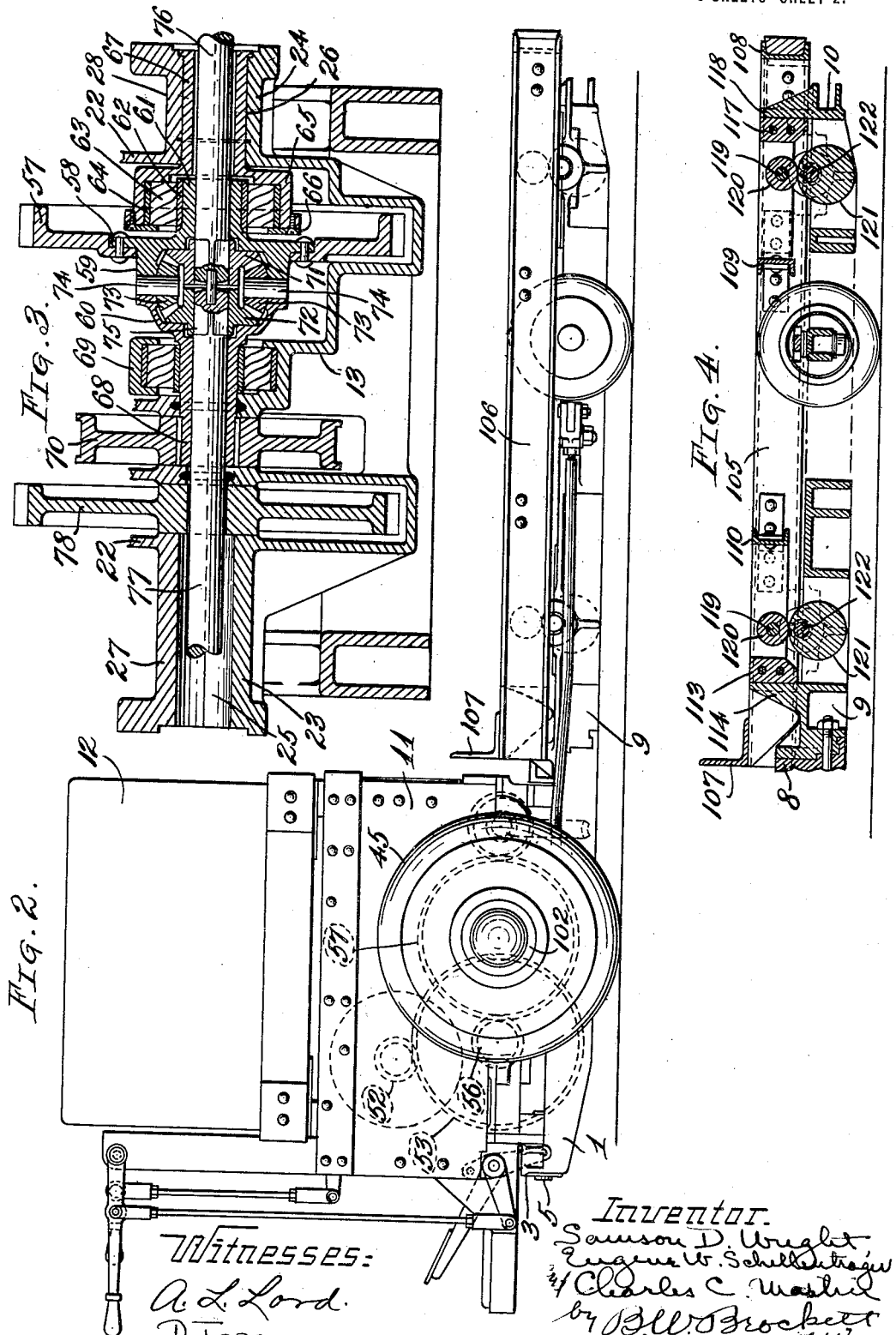

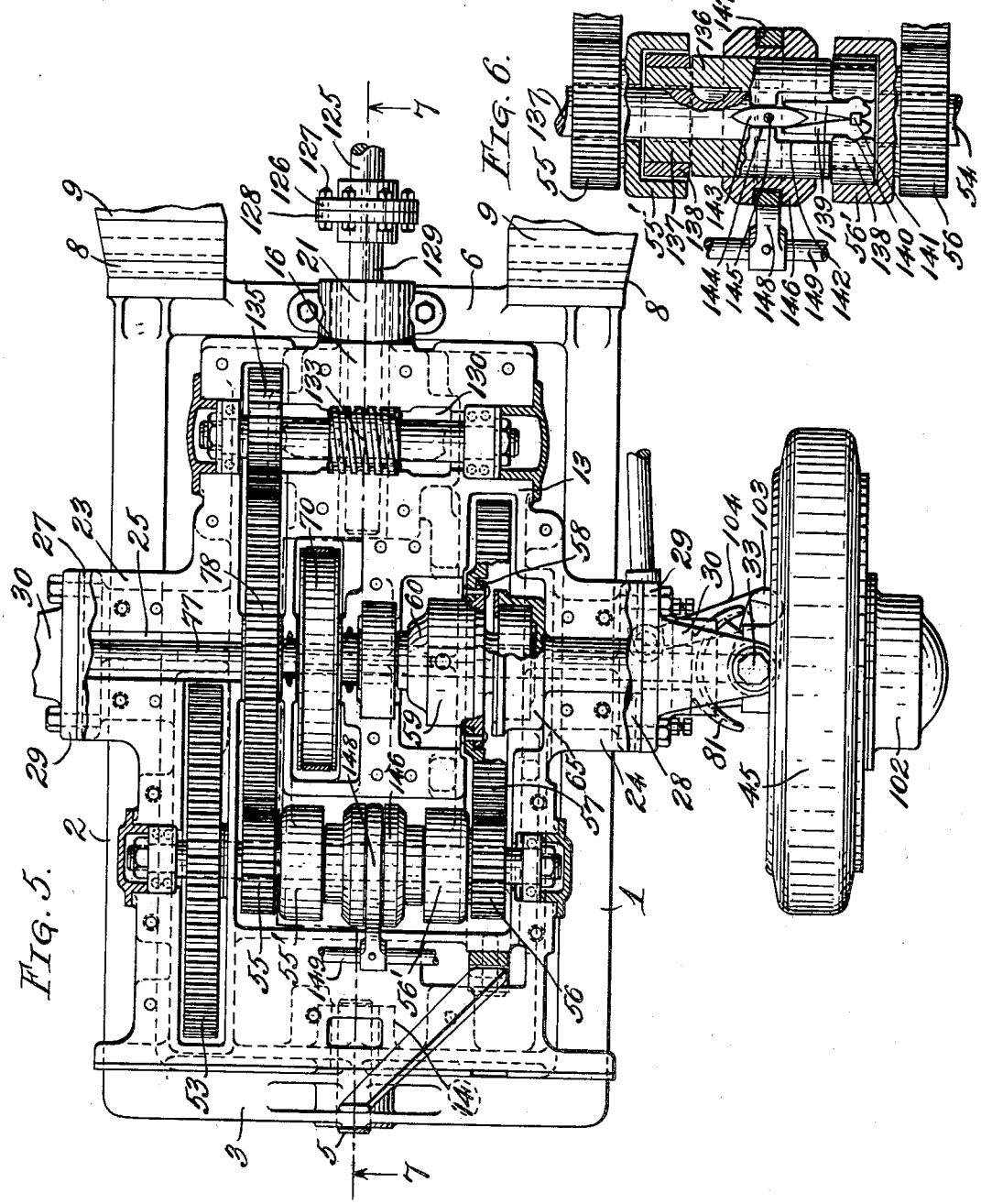

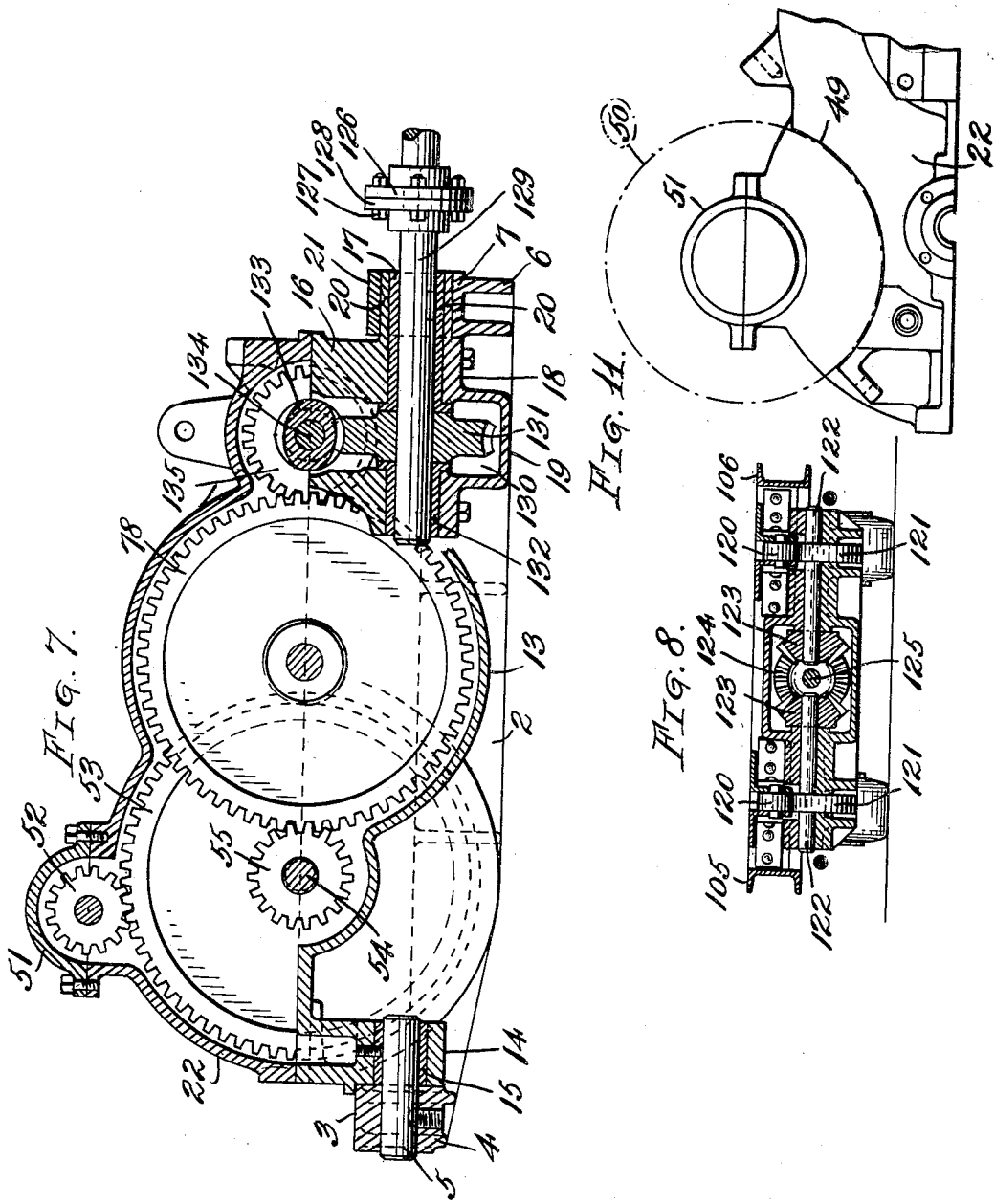

1,313,151.

Patented Aug. 12, 1919.

5 SHEETS—SHEET 5.

Witnesses:
A. L. Lord.
D. Tozer.

Inventor.
Samson D. Wright
Eugene W. Schellentrager
Charles C. Martin
by B. W. Brockett
Atty.

UNITED STATES PATENT OFFICE.

SAMSON D. WRIGHT, EUGENE W. SCHELLENTRAGER, AND CHARLES C. MARTIN, OF CLEVELAND, OHIO; SAID SCHELLENTRAGER AND SAID MARTIN ASSIGNORS TO ATLAS CAR AND MANUFACTURING COMPANY, OF CLEVELAND, OHIO.

TRUCK.

1,313,151.      Specification of Letters Patent.      Patented Aug. 12, 1919.

Application filed August 28, 1915. Serial No. 47,772.

*To all whom it may concern:*

Be it known that SAMSON D. WRIGHT, EUGENE W. SCHELLENTRAGER, and CHARLES C. MARTIN, citizens of the United States, residing at Cleveland, in the county of Cuyahoga and State of Ohio, have invented certain new and useful Improvements in Trucks, of which the following is a specification.

This invention relates generally to motor propelled vehicles and particularly to trucks actuated by an electric motor supplied with current from a storage battery mounted upon the truck.

More specifically the invention relates to a truck of this type having the motor together with the gearing for the several operations arranged in a housing or casing supported directly upon the driving wheels and having pivotally connected thereto, on a longitudinal axis, a frame forming the body and supporting the storage batteries as well as the load, the frame being also supported by other wheels arranged under the frame.

The invention also relates to suitable means for elevating the platform from the driving mechanism, the arrangement of the gearing being such that a single motor is utilized to propel the vehicle in either direction and to raise the load.

The invention may be further briefly summarized as consisting in the construction and combination of parts hereinafter set forth in the following description, drawings and claims.

Figure 9:
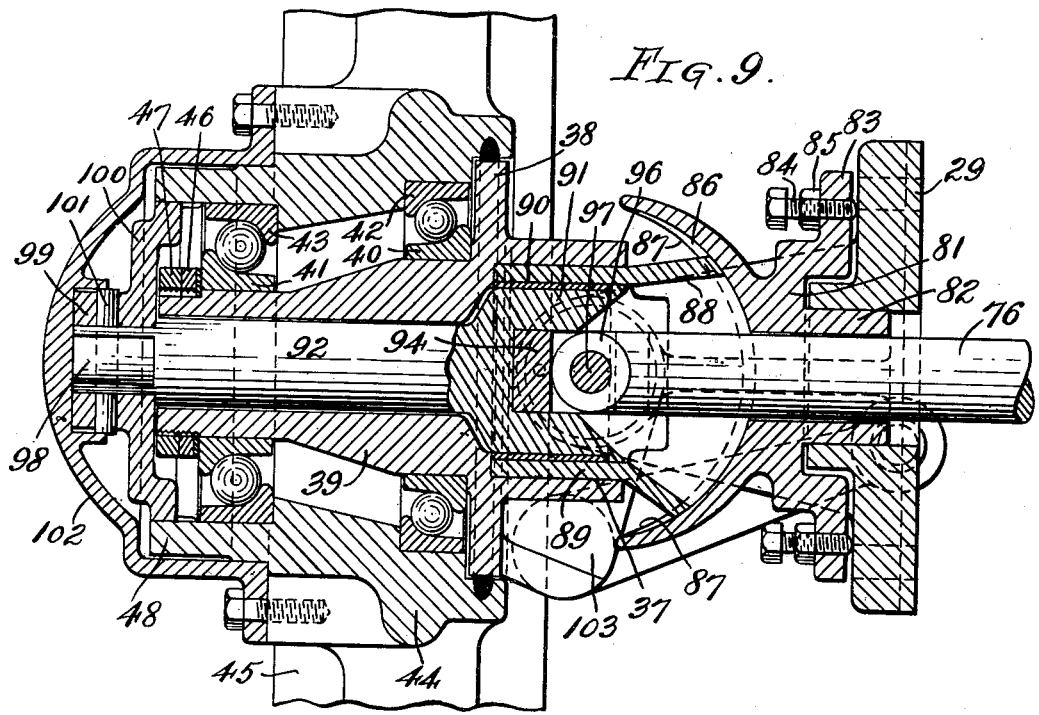
Figure 10:
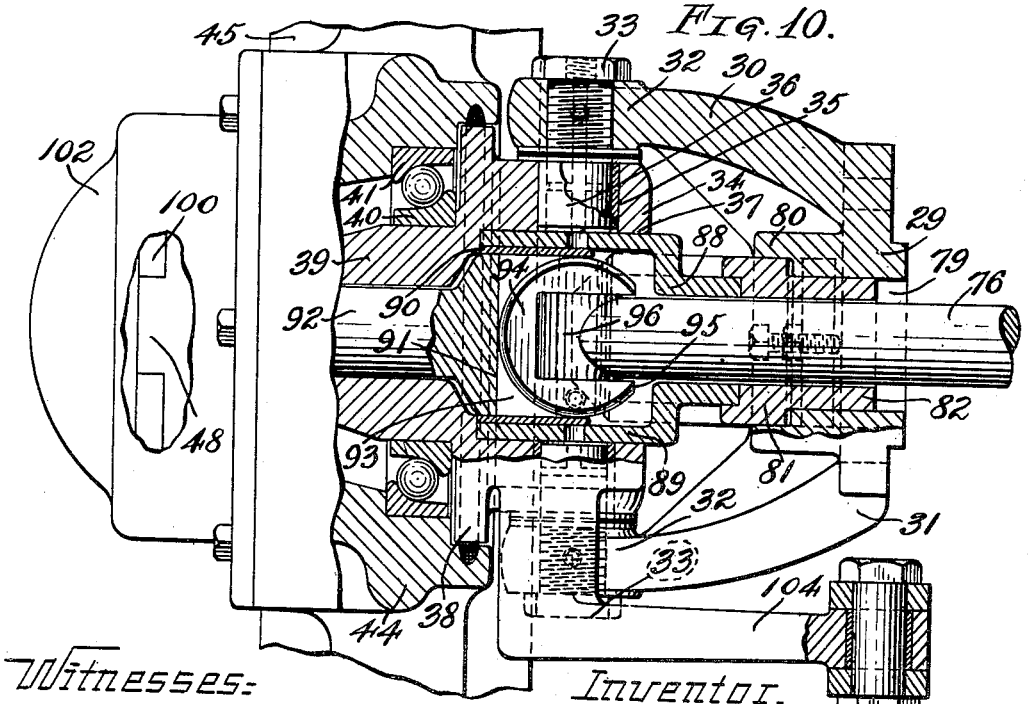

Referring to the drawings, Figure 1 is a top plan view of the device; Fig. 2 is a side elevation; Fig. 3 is a vertical sectional view through the axle section showing the differential gearing and other parts of the frame and housing; Fig. 4 is a sectional view upon the line 4—4 of Fig. 1, showing the platform elevating mechanism; Fig. 5 is a top plan view with the upper portion of the gearing and transmission housing removed, showing the parts in elevation with some broken away; Fig. 6 is a detail view partly in section and partly in elevation of the clutch mechanism utilized for transmitting the power either to the drive or to the platform elevating mechanism; Fig. 7 is a section upon the line 7—7 of Fig. 5; Fig. 8 is a section upon the line 8—8 of Fig. 1; Fig. 9 is a horizontal section through one of the driving wheels with parts broken away; and Fig. 10 is a view partly in elevation and partly in section; the sectional parts being taken upon a vertical plane passing through one of the driving wheels.

In carrying out the invention the motor, together with the driving wheels, their differential mechanism, the clutch mechanism, and the transmission mechanism for the platform elevating device, are all arranged in a unit having pivotally connected therewith on a longitudinal axis the frame which is supported near its outer end by a suitable wheel; the frame being provided with an elevating platform which is raised by suitable mechanism supported on the frame and operated from the main gearing. The several parts will be taken up and described.

*Main frame.*

The main frame is made up of two parts, the forward portion of which is supported upon the driving mechanism and the platform portion of which is secured to it and receives the platform. The forward portion of the frame comprises side members 1 and 2 connected by a forward end portion 3 having a downwardly extending ear 4 at the forward end receiving a pin 5 supporting the power transmission mechanism, as will later appear. The rear ends of this frame are connected by a transverse frame member 6 carrying at the center a bearing portion 7 which forms the other connection of the power transmission mechanism and forms another point of support for the frame, as will appear. This transverse frame member 6 is provided at its outer end with suitable plate portions 8 one on each side, and to these portions are secured the side members 9 of the platform frame, these side members 9 being connected by a transverse member 10 at the rear end. Mounted upon the forward frame portion is a suitable casing 11 of any preferred construction arranged to incase the power transmission mechanism and above this is a suitable battery case 12 adapted to receive a storage battery of any preferred type.

*Main driving and power transmission mechanism.*

This mechanism comprises a lower housing 13 having at the forward end a downwardly extending ear 14 provided with a bushing 15 adapted to receive the pin 5 in a manner such that the lower housing supports the frame at this point. At the rear end the housing 13 is provided with a bearing portion 16 engaging a bushing 17 arranged between the housing and a lower cap bearing 18' forming a part of a worm gear cap 19. Each of these bearing portions 16 and 18 have half-round extensions 20 extending over the bushing 17, and the latter 18 engages in the bearing 7 forming a part of the rear cross frame member 6 of the forward frame portion. A suitable cap 21 secured to the cross frame member 6 engages the extension 20 and holds these parts in place, such that the frame may swing freely on the housing at this point, the extensions 20 moving in the cap 21 and the bearing 7.

To this lower housing member 13 is secured an upper housing member 22, and these two housings incase all of the power transmission mechanism, and the upper one supports the motor. They are both provided with suitable pockets and recesses for receiving the several elements and it is considered to be unnecessary to go into a detail description of these different specific features but the more important parts will be taken up in the description of the several pieces of mechanism.

Referring now to Figs. 3 and 5, the lower housing 13 is provided with axle section extensions 23 and 24, the former being provided with a channel 25 for the passage of an axle section, as will appear, and the latter being provided with a similar channel 26 for the passage of a casing, as will appear. Coöperating with these two axle section extensions are extensions 27 and 28 carried by the upper housing member 22. Both of these pairs of extensions are finished on their ends to receive the wheel structure, and since the two wheel structures for the forward portion are similar, a description of one will suffice for both.

*Forward wheel structure.*

Secured to the ends of one pair of axle extensions is a face plate 29 having upper and lower spaced arms 30 and 31 which form a yoke. Each of these extensions is provided with a suitable internally threaded eye 32 for the reception of a pivot pin 33, these two pins having extensions extending inward beyond the eye and being arranged in a vertical line. These two pins form the support for the transmission mechanism, and the balance of the forward portion of the truck, and they engage the wheel mechanism itself, in that these pins are mounted in the shell around which the wheel rotates. The shell referred to comprises an extension 34 having alining openings 35 in its top and bottom for the reception of bushings 36 which receive the pins 33. This extension is also provided with an opening 37 concentric with the wheel and for the purpose of receiving a universal joint structure utilized in connection with the drive as will appear. Forming part of the extension 34 is a circular flange 38 and integral with this flange is a pivot sleeve 39 which receives a pair of inner ball races 40 and 41, the former being toward the inside of the wheel. These ball races coöperate with external races 42 and 43 respectively arranged in the hub 44 of the wheel 45. The race 40 engages the flange 38 and the race 41 is held in place by suitable nuts 46 and 47 secured upon the pivot sleeve. It will be seen from the foregoing that the wheel is mounted to rotate freely on the pivot sleeve and may be moved on a vertical axis by reason of the pivoted arrangement between the yoke and the shell. The hub 44 of the wheel 45 beyond the race 43 is provided with jaws or projections 48 adapted to be engaged by a suitable driving coupling, as will appear.

It will be seen from the foregoing that the main driving and power transmission mechanism is supported directly upon the wheels which may be moved for steering and the forward portion of the frame is pivoted on the longitudinal axis of the truck upon the transmission housing in a manner such that the frame may equalize itself laterally upon these parts. The drive to the wheels and to the platform elevating mechanism to be later described will now be set forth.

*Wheel driving mechanism.*

The upper housing 22 is provided near the forward end with an arc-shaped seat 49 for the reception of a suitable motor 50, the shaft of which projects into a suitable housing formed by a portion of the upper housing 22 and a cap 51 is adapted to receive a main driving pinion 52 which meshes with a main driving gear 53 keyed to a countershaft 54 arranged in suitable bearings and extending across the transmission housing. This shaft is provided with a pair of counter-shaft pinions 55 and 56, loose upon the shaft and having clutch drums 55' and 56' respectively, the former engaging the other gearing connected with the platform elevating mechanism, to be described, and the latter engaging a differential driving gear 57 secured to a flange 58 forming a part of one differential housing member 59, secured to a corresponding differential housing member 60. The differential housing member 59 is provided with a sleeve extension 61 having an inner roller race 62 engaging rollers 63 arranged between it and an external race 64 mounted in a bearing casing 65. This bearing casing is provided with a plate 66 secured to the inner edge for holding the bearing in place and on the opposite side is provided with a bearing case sleeve extension 67 adapted to be clamped between the axle housing extensions 24 and 28, as shown clearly in Fig. 3. In this way the differential housing is supported on the right-hand side as shown in this figure. The opposite differential housing member 60 is provided with a relatively longer sleeve 68 arranged in a suitable roller bearing structure 69 between the two housings, and beyond this it is keyed to a suitable brake drum 70 adapted to be engaged by any suitable band brake mechanism, not shown. Inside of the two housing members 59 and 60 are suitable shaft section gears 71 and 72 and these two gears mesh with planetary bevel pinions 73 arranged on suitable studs 74 secured in the housing. Each of these shaft section gears is provided with a squared opening 75, and these two openings receive the ends of the shaft sections 76 and 77, the former extending to one wheel and the latter extending through an intermediate platform elevating gear 78 and through the housing extensions 23 and 27 to the opposite wheel. These two shaft sections are connected with the wheels, and since the connections with the two wheels are similar in structure, a description of one will suffice for both.

Referring now to Figs. 9 and 10, a description will be given of the wheel driving mechanism associated with the shaft section 76. The face plate 29 is provided with a central circular opening 79 extending through the same and having its axis in alinement with the center of the wheel. On the inside of the arms 30 the face plate is provided with upper and lower parallel guides 80 adapted to engage the side faces of a shaft housing 81 which has a sleeve extension on 82 fitting tightly within the opening 79 but capable of movement therein. This shaft housing 81 is further provided with foot extensions 83 each provided with a suitable adjusting screw 84 and a check nut 85. These adjusting screws are utilized in moving the block outward with respect to the face plate 29. The shaft housing 81 is further provided with an arc-shaped recess 86 on its outer end, and this recess is provided with upper and lower flanges 87 forming an arc-shaped channel, as it were. Engaging in this channel is a grease and oil retaining member having an extension 88 preferably open at its right-hand end as shown in Figs. 9 and 10, rectangular in cross section at this point and having its ends spread, as shown in Fig. 9, so that when the open end engages within the channel formed by the recess 86 and the flanges 87 it may move therein and still the opening at the end will be closed. This retaining member 88 is provided with a cylindrical portion 89 fitted tightly in the opening 37 in the shell upon which the wheel is pivoted but it has no rotation in this opening. In this way it will be seen that grease and oil are prevented from passing out of the wheel structure at this point, and any adjustment between the parts may be made by the adjusting screws 84.

Secured in the cylindrical portion of the shaft housing is a hardened bushing 90 which is adapted to receive and form a bearing for a yoke member 91 formed on the end of the wheel driving shaft 92 and forming a part of the universal joint. This yoke member has a diametrical opening 93 extending through the same and adapted to receive a circular block 94 which has flat sides and a rounded or curved periphery 95, so that it may move freely in the opening 93 and within the hardened bushing 90. The block 94 is also provided with a recess or notch extending out to the periphery at right-angles to the recess 93 when the block is arranged therein, and this recess receives an eye 96 formed on the end of the shaft section 76 and pivoted upon a pin 97 arranged in the circular block 94. By this arrangement it will be seen that a universal joint is provided, and the axis of this joint is coincident with the axis of the support of the wheel, so that as the wheel is turned for steering the drive is transmitted through the universal joint.

The connection between the wheel driving shaft 92 and the hub of the wheel is brought about by suitable coupling mechanism, and it comprises a squared extension 98 formed on the end of the shaft 92 and receiving the hub 99 of a coupling member 100, which is provided with suitable notches and teeth adapted to coöperate with the notches and teeth 48 formed in the hub of the wheel. The hub of this coupling member is held in place by a pin 101 extending through the hub and through the squared end of the shaft. A suitable cap 102 is secured to the outside of the hub of the wheel for covering these parts and for holding the grease within the hub.

In order to shift the wheel for steering a suitable extension 103 is formed integral with the shell upon which the wheel rotates, and this extension is provided with an arm 104 connected to the steering mechanism.

*Elevating platform and its elevating mechanism.*

The platform comprises a frame consisting of side members 105 and 106, preferably of channel sections, and connected at the front end by a transverse channel section 107 and at the rear by a transverse angle section 108. Intermediate the ends the frame is provided with cross members 109 and 110, the former being arranged toward the rear of the frame, and the latter toward the front. Between the cross member 110 and the front end frame member 107 are two pairs of longitudinally disposed guide members 111 and 112, a pair being arranged near each side of the frame, and between these members is secured, toward the front end of the frame, a suitable guide block 113 adapted to be engaged by a guide lug 114 forming a part of the rear frame portion of the main frame. There is a block 113 and a lug 114 between the other pair of members 111 and 112 at the opposite side of the machine. In like manner at the rear end of this platform frame and between the cross member 109 and the frame member 108 there are two pairs of longitudinally disposed guide members 115 and 116, one pair arranged near each side of the machine and having arranged between them a guide block 117 engaging a lug 118 secured to the rear frame portion of the main truck frame. From the foregoing construction it will be seen that the platform frame is movable up and down upon the rear portion of the main truck frame and is guided transversely by the pairs of members 111 and 112, and 115 and 116, and is held against longitudinal shifting with respect to the rear portion of the main truck frame by the engagement between the blocks 113 and 117 with the lugs 114 and 118.

*Platform raising mechanism.*

Arranged in each pair of the longitudinal guides 111 and 112 of the platform frame is a pin 119 carrying a friction roller 120 and each of these rollers engages a cam 121 mounted upon a short transverse shaft 122 supported in the rear portion of the main truck frame and extending to the center. At the center each of these shafts is provided with a beveled gear 123 and the beveled gears of the two opposed shafts 122 extending from either side of the rear frame portion mesh with a beveled gear 124 arranged upon a longitudinally disposed elevating driving shaft 125 supported in suitable bearings in the rear portion of the main frame. There are two complete sets of these gears, as is shown, to operate the cams arranged near the corners of the platform. The shaft 125 extends toward the forward end of the rear frame portion and is provided with a coupling member 126 secured by bolts 127 to another coupling member 128 connected to a worm wheel drive shaft 129 which extends through the bushing 17 into a suitable chamber 130 formed in the lower housing of the transmission mechanism. Within this chamber is a worm wheel 131 secured to the shaft 129. The other end of the shaft 129 is supported in a bushing 132 secured in the lower housing. This worm wheel meshes with a worm 133 supported upon a shaft 134 in turn supported in suitable bearings arranged between the upper and lower housing. This shaft 134 is provided with a pinion 135 which meshes with intermediate elevating driving gear 78 loosely mounted upon the shaft section 77. In this way the drive is transmitted from the pinion 55 to the elevating mechanism.

In order to properly control the drive to the pinions 55 and 56, suitable clutch mechanism is arranged between the clutch drums 55' and 56' of these two pinions, and this mechanism consists of an internal sleeve member 136 keyed to the shaft and provided near each of its ends with a reduced portion 137, one of these portions being immediately inside of each of the clutch drums. Surrounding each of these reduced portions is a clutch band 138 split at one point to receive a pair of expanding arms or levers 139. These two expanding levers are provided with a projection 140 engaging in a suitable recess in the corresponding end of the band. A suitable pivot block 141 is arranged in suitable recesses between the levers, the arrangement being such that when the outer or free ends of these levers are moved outward the band is expanded and when they are moved toward each other the band contracts. The free ends of these levers extend into a suitable recess 142 arranged in the sleeve 136 and in a position to receive one end of the double-ended wedge 143 slidably mounted in a suitable longitudinally disposed slot 144 arranged in the sleeve. This wedge receives a pin 145 carried by a clutch collar 146. This clutch collar has a peripheral recess 147 adapted to be engaged by a suitable fork 148 mounted upon a shifting rod 149 suitably supported in the lower housing. By the arrangement of the mechanism just described and referring particularly to Fig. 6, when the clutch collar is shifted upward, as shown in this figure, the free ends of the levers will be moved outward and the band will be expanded so that the drive is transmitted from the shaft 54 to the pinion 55, with the result that the platform will be raised or lowered according to the position it assumed before this operation. The clutch is then released, and if the drive for propelling the vehicle is to be thrown in, the clutch is shifted in the opposite direction when the shaft 54 will be connected to the pinion 56, with the result that the transmission mechanism will bring about the drive in an obvious manner.

Having described our invention we claim:

1. In a motor truck, driving wheels, a housing supported thereby, a main frame, supporting wheels therefor, a movable platform on said frame, said housing being connected to turn on a longitudinal axis relative to said main frame, motor means carried by said housing, and operating gearing for said wheels and platform connected to said motor means.

2. In a motor truck, driving wheels, a housing supported thereby, a main frame, supporting wheels therefor, a movable platform on said frame, said housing being connected to turn on a longitudinal axis relative to said main frame, motor means carried by said housing, and operating gearing for said wheels and platform connected to said motor means, said operating gearing for the platform including a shaft co-axial with the axis of relative turning movement of the housing and frame.

3. In a motor truck, driving wheels, a housing supported thereby, a main frame, supporting wheels therefor, a movable platform on said frame, said housing being connected to turn on a longitudinal axis relative to said main frame, motor means carried by said housing, and operating gearing for said wheels and platform connected to said motor means, said gearing including clutch devices for operatively connecting either the wheels or platform to said motor means.

4. In a motor truck, driving wheels, a housing supported thereby, a main frame, supporting wheels therefor, a movable platform on said frame, said housing being connected to turn on a longitudinal axis relative to said main frame, motor means carried by said housing, and operating gearing for said wheels and platform connected to said motor means, said gearing including clutch devices for operatively connecting either the wheels or platform to said motor means, said operating gearing for the platform including a shaft co-axial with the axis of relative turning movement of the housing and frame.

5. In a motor truck, driving wheels, a housing supported thereby, a main frame, supporting wheels therefor, a platform movable on said frame, said housing being provided with trunnions so arranged that it can turn on a central longitudinal axis relative to said main frame, one of said trunnions being hollow, motor means carried by said housing, operating gearing connecting said motor means to said driving wheels, and operating connections for said platform extending from said motor means through said hollow trunnion.

6. In a motor truck, driving wheels, a housing supported thereby, a main frame, supporting wheels therefor, a platform movable on said frame, said housing being provided with trunnions journaled in said frame and so arranged that the housing can turn on a central longitudinal axis relative to said frame, a motor carried by said housing, operating connections between the said motor and driving wheels, and operating connections for said platform.

7. In a motor truck, driving wheels, a housing supported thereby, a main frame, supported wheels therefor, a platform movable on said frame, said housing being provided with trunnions journaled in said frame and so arranged that the housing can turn on a central longitudinal axis relative to said frame, one of said trunnions being hollow, a motor carried by said housing, operating connections between the said motor and driving wheels, and operating connections for said platform including a shaft passing through said hollow trunnion, said operating connections including clutch devices carried by the housing and arranged when operated to selectively connect the motor to either the wheels or platform.

In testimony whereof we affix our signatures in presence of two witnesses as follows:

SAMSON D. WRIGHT.
EUGENE W. SCHELLENTRAGER.
CHARLES C. MARTIN.

Witnesses:
ALTON H. BEMIS,
D. TOZER.

Copies of this patent may be obtained for five cents each, by addressing the "Commissioner of Patents, Washington, D. C."